US012476096B2

(12) United States Patent
Toji

(10) Patent No.: US 12,476,096 B2
(45) Date of Patent: Nov. 18, 2025

(54) IONIZER AND MASS SPECTROMETER

(71) Applicant: SHIMADZU CORPORATION, Kyoto (JP)

(72) Inventor: Yohei Toji, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 391 days.

(21) Appl. No.: 17/919,951

(22) PCT Filed: Apr. 24, 2020

(86) PCT No.: PCT/JP2020/017638
§ 371 (c)(1),
(2) Date: Oct. 19, 2022

(87) PCT Pub. No.: WO2021/214964
PCT Pub. Date: Oct. 28, 2021

(65) Prior Publication Data

US 2023/0162961 A1 May 25, 2023

(51) Int. Cl.
*H01J 49/04* (2006.01)
*H01J 49/16* (2006.01)

(52) U.S. Cl.
CPC ........ *H01J 49/045* (2013.01); *H01J 49/0468* (2013.01); *H01J 49/167* (2013.01); *H01J 49/044* (2013.01)

(58) Field of Classification Search
None
See application file for complete search history.

(56) References Cited

U.S. PATENT DOCUMENTS

| | | | | |
|---|---|---|---|---|
| 5,360,976 A * | 11/1994 | Young | H01J 49/0468 250/281 |
| 5,756,995 A * | 5/1998 | Maswadeh | H01J 49/24 250/288 |
| 11,056,330 B2 * | 7/2021 | Silivra | H01J 49/26 |
| 2005/0199800 A1 * | 9/2005 | Harada | H01J 49/167 250/288 |

(Continued)

FOREIGN PATENT DOCUMENTS

| | | |
|---|---|---|
| JP | 2011-113832 A | 6/2011 |
| JP | 2015-049077 A | 3/2015 |

OTHER PUBLICATIONS

Notification of Allowance dated May 30, 2023 from the Japanese Patent Office in application No. 2022-516784.

(Continued)

*Primary Examiner* — Robert H Kim
*Assistant Examiner* — Alina Kaliszewski
(74) *Attorney, Agent, or Firm* — Sughrue Mion, PLLC

(57) ABSTRACT

An ionizer including: an ionization chamber 2; a sample nozzle 60 configured to cause a liquid sample to flow out into the ionization chamber 2; an assist gas passage 61 configured to supply, to the ionization chamber 2, an assist gas that promotes desolvation of the liquid sample; a heater 62 disposed inside the assist gas passage 61; and a heat transfer member 64 disposed in the assist gas passage 61 in contact with the heater 62. The heat transfer member 64 can be disposed, for example, inside the heater 62 including a spirally wound heater wire and between the heater 62 and an inner wall surface of the assist gas passage 61.

10 Claims, 7 Drawing Sheets

(56) References Cited

U.S. PATENT DOCUMENTS

| | | | | |
|---|---|---|---|---|
| 2005/0258358 | A1 | 11/2005 | Thakur | |
| 2015/0060566 | A1* | 3/2015 | Nakano | B05B 9/002 239/135 |
| 2021/0358734 | A1* | 11/2021 | Hasegawa | G01N 30/7266 |

OTHER PUBLICATIONS

International Search Report for PCT/JP2020/017638 dated Jul. 7, 2020 [PCT/ISA/210].
Written Opinion for PCT/JP2020/017638 dated Jul. 7, 2020 [PCT/ISA/237].
Office Action issued Mar. 24, 2025 in Chinese Patent Application No. 202080099032.5.

* cited by examiner

IONIZER AND MASS SPECTROMETER

CROSS REFERENCE TO RELATED APPLICATIONS

This application is a National Stage of International Application No. PCT/JP2020/017638 filed Apr. 24, 2020.

TECHNICAL FIELD

The present invention relates to an ionizer and a mass spectrometer.

BACKGROUND ART

One type of device for analyzing a substance contained in a liquid sample is a liquid chromatograph mass spectrometer. In the liquid chromatograph mass spectrometer, a liquid sample is introduced into a column of a liquid chromatograph by being carried by a flow of a mobile phase, and a target substance is separated in the column from other substances. The target substance flowing out of the column is ionized by an ion source of the mass spectrometer, is separated according to the mass-to-charge ratio, and is then measured.

As an ion source of the mass spectrometer, for example, an electrospray ionization (ESI) source is used. The ESI source introduces a liquid sample into a nozzle (ESI nozzle) having a double tube structure to charge the liquid sample and sprays the charged liquid sample into an ionization chamber. The ESI source includes: a first channel into which the liquid sample is introduced; and a second channel provided on an outer periphery of the first channel into which a nebulizer gas is introduced. In the ESI source, a predetermined voltage (ESI voltage) is applied to the first channel to charge the liquid sample, and the nebulizer gas is blown to charged droplets of the liquid sample flowing out from a tip of the first channel so that the charged droplets are sprayed into the ionization chamber. The charged droplets sprayed into the ionization chamber are split by electric charge repulsion inside the droplets, and vaporization (desolvation) of the mobile phase creates ions.

Patent Literatures 1 and 2 describe an ESI source including a mechanism configured to supply an assist gas for promoting desolvation of the charged droplets of the liquid sample. The mechanism for supplying the assist gas includes: a third channel to which the assist gas is supplied; and an assist gas nozzle for supplying the assist gas supplied from the third channel to an outer periphery of a jet flow of the liquid sample from the ESI nozzle. A heater is disposed inside the third channel, and desolvation is promoted by the assist gas which is heated by the heater and is supplied to the charged droplets of the liquid sample.

CITATION LIST

Patent Literature

Patent Literature 1: JP 2011-113832 A
Patent Literature 2: JP 2015-049077 A

SUMMARY OF INVENTION

Technical Problem

In recent years, in the liquid chromatograph mass spectrometry, analysis of a wide variety of substances has been performed, and various analysis conditions are also used for the analysis. The optimum temperature of the assist gas varies depending on characteristics of a target substance and analysis conditions. Patent Literatures 1 and 2 describe that an assist gas heated to 400° C. to 500° C. is blown to charged droplets. However, in the case of analysis of a substance that is difficult to vaporize or in the case of analysis in which a mobile phase is supplied at a high flow velocity, desolvation is not sufficient, and it is required that a higher-temperature assist gas is used to promote desolvation of the charged droplets.

Patent Literature 2 describes that a micro-sheath heater is used as a heater to heat an assist gas. Though the micro-sheath heater has a high heat resistance temperature of about 600° C., it is made of a thin wire so that an even slightly excessive supply power could destroy the heater. When a heater having a high heat resistance is used to prevent this problem, the cost increases.

In the above, the problems of a conventional art have been described taking the assist gas in the ESI source as an example, but other ion sources, for example, atmospheric pressure chemical ionization (APCI) sources have the same problems as described above.

The problem to be solved by the present invention is to provide, at low cost, a technique capable of promoting desolvation of a liquid sample with an assist gas having a higher temperature than before.

Solution to Problem

An ionizer, according to the present invention, made to solve the above problem includes:

an ionization chamber;

a sample nozzle configured to cause a liquid sample to flow out into the ionization chamber;

an assist gas passage configured to supply, to the ionization chamber, an assist gas that promotes desolvation of the liquid sample;

a heater disposed inside the assist gas passage; and a heat transfer member disposed in the assist gas passage in contact with the heater.

Advantageous Effects of Invention

In the ionizer according to the present invention, the assist gas for promoting desolvation of the liquid sample is supplied to the liquid sample flowing out from the sample nozzle. In the assist gas passage through which the assist gas flows, the heat transfer member in addition to the heater is disposed in contact with the heater. In the conventional ionizer, only the heater is disposed in the assist gas passage, and most of the assist gas flowing in the assist gas passage is released without contacting the heater. On the other hand, in the ionizer according to the present invention, since the heat transfer member is disposed in addition to the heater, the contact area between the assist gas flowing through the assist gas passage and a heat source (the heater and the heat transfer member) is larger than before. Therefore, the assist gas is heated with higher efficiency, and it is possible to supply the assist gas having a higher temperature than before. In addition, a heater similar to the conventional heater can be used, and the ionizer can be configured at low cost.

DESCRIPTION OF EMBODIMENTS

An embodiment of an ionizer according to the present invention will be described below with reference to the drawings. The ionizer of the present embodiment is incorporated as an ionization part of a mass spectrometer, and ionizes a liquid sample containing a target substance.

Figure 1:
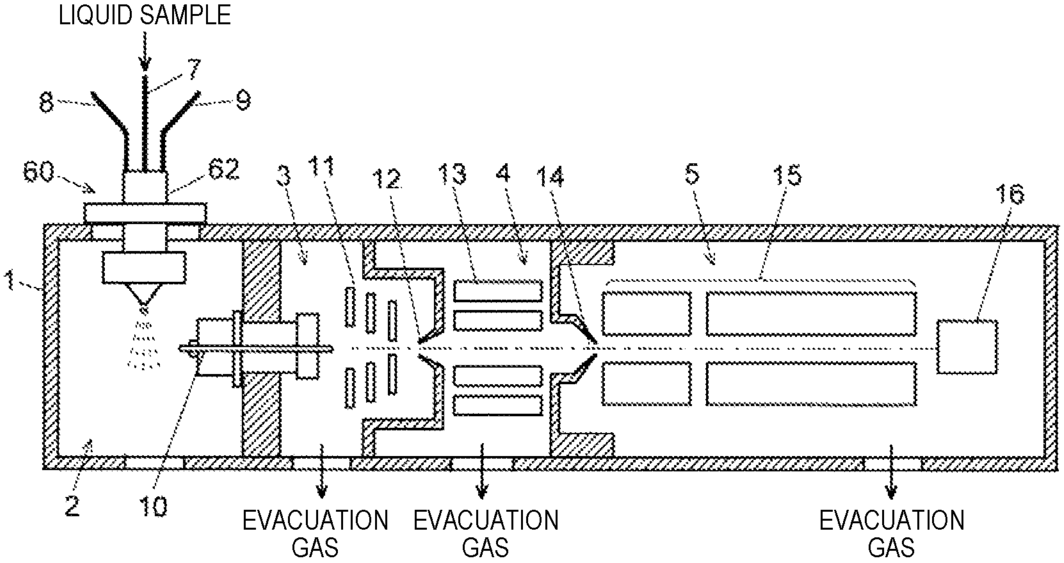
FIG. 1 is a schematic configuration diagram of a mass spectrometer including an embodiment of an ionizer according to the present invention.

FIG. 1 is a configuration diagram of a main part of a mass spectrometer. The mass spectrometer includes, inside a chamber 1: an ionization chamber 2; a first intermediate vacuum chamber 3; a second intermediate vacuum chamber 4; and an analysis chamber 5. In the ionization chamber 2, there is disposed an ESI ionization probe 60 that ionizes components in the liquid sample. In the first intermediate vacuum chamber 3 and the second intermediate vacuum chamber 4, there are respectively disposed ion guides 11 and 13 that are configured to transport ions while converging the ions. In the analysis chamber 5, there are disposed a quadrupole mass filter 15 and an ion detector 16 that separate ions according to the mass-to-charge ratio m/z are disposed.

The ionization chamber 2 and the first intermediate vacuum chamber 3 communicate with each other through a thin heated capillary 10. The first intermediate vacuum chamber 3 and the second intermediate vacuum chamber 4 communicate with each other through an ion passage hole formed at the top of a skimmer 12. The second intermediate vacuum chamber 4 and the analysis chamber 5 communicate with each other through an ion passage opening 14.

The inside of the ionization chamber 2 is in an ambience of substantially atmospheric pressure. On the other hand, the inside of the analysis chamber 5 is vacuum-evacuated to a high vacuum state of, for example, about $10^{-3}$ to $10^{-4}$ Pa by a high-performance vacuum pump (not illustrated). The first intermediate vacuum chamber 3 and the second intermediate vacuum chamber 4, which are sandwiched between the ionization chamber 2 and the analysis chamber 5, are also each vacuum-evacuated with a vacuum pump, and constitute a multi-stage differential pumping system in which a degree of vacuum is increased stepwise.

An analysis operation in the mass spectrometer of the present embodiment will be briefly described. A liquid sample for analysis is introduced into a liquid sample supply tube 7 of the ESI ionization probe 60. The liquid sample supply tube 7 has a configuration in which, for example, a conductive passage connection jig connects two capillaries to each other, and a predetermined voltage (ESI voltage) is applied to the passage connection jig. This voltage charges the liquid sample.

When the liquid sample flows out of the ESI ionization probe 60, a nebulizer gas (atomization-promoting gas) is blown to the liquid sample from the nebulizer gas supply tube 8, and the liquid sample is sprayed into the ionization chamber 2 as fine charged droplets. Further, the assist gas, which is a heated gas, is supplied to the charged droplets sprayed into the ionization chamber 2 from the assist gas supply line 9, so that a mobile phase (solvent) is desolvated from the charged droplets, and a substance in the sample is ionized.

The ions generated in the ionization chamber 2 are drawn into the heated capillary 10 by a pressure difference between the ionization chamber 2 and the first intermediate vacuum chamber 3. The desolvation further proceeds while the charged droplets are passing through the heated capillary 10, and the generation of ions is promoted.

The ions introduced into the first intermediate vacuum chamber 3 through the heated capillary 10 are converged by the action of the electric field formed by the ion guide 11, and are introduced into the second intermediate vacuum chamber 4 through the ion passage hole at the top of the skimmer 12. The ions are converged by the action of the electric field formed by the ion guide 13 in the second intermediate vacuum chamber 4, and are transferred to the analysis chamber 5 through the ion passage opening 14. In the analysis chamber 5, only the ions having a specific mass-to-charge ratio pass through the space in the long axis direction of the quadrupole mass filter 15 and reach the ion detector 16 to be detected. Because the mass-to-charge ratio of the ions passing through the quadrupole mass filter 15 depends on a DC voltage and a radio-frequency voltage applied to the filter 15, it is possible to scan the mass-to-charge ratio of the ions incident on the ion detector 16 over a predetermined range by, for example, scanning the applied voltage.

Figure 2:
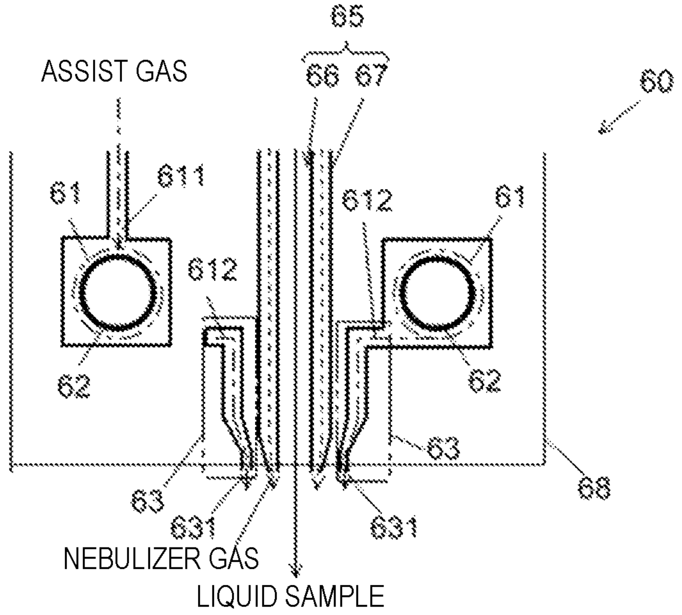
FIG. 2 is a diagram illustrating an internal structure of a tip portion of an ESI ionization probe that is the ionizer of the present embodiment.
Figure 3:
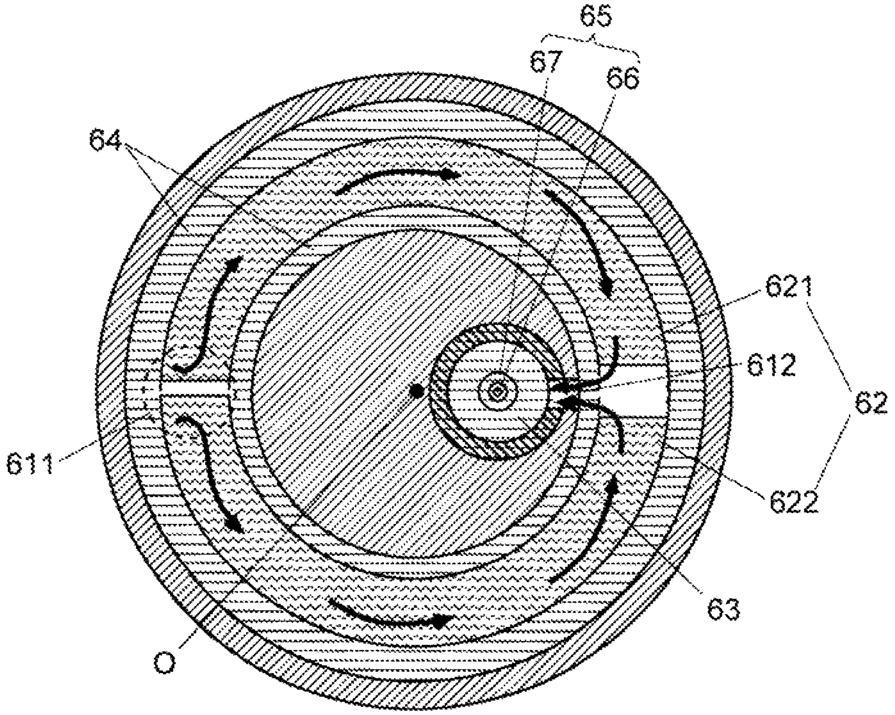
FIG. 3 is a schematic diagram of a cross-section of the tip portion of the ESI ionization probe that is the ionizer of the present embodiment.

Next, a configuration of the ESI ionization probe 60 of the present embodiment will be described. FIG. 2 is a schematic diagram of a cross-section illustrating an internal structure of the tip portion of the ESI ionization probe 60 illustrated in FIG. 1. FIG. 3 is a schematic diagram of a cross-section (a cross-section orthogonal to the direction in which the liquid sample flows) of the tip portion of the ESI ionization probe 60. In FIG. 2, heat transfer members 64 are not shown in order to clearly illustrate an assist gas passage 61.

In the ESI ionization probe 60, a nozzle 65 for spraying the liquid sample includes: a capillary 66 through which the liquid sample flows; and a nebulizer gas tube 67 provided coaxially with the capillary 66 on the outer periphery of the capillary 66. The space between the outer periphery of the capillary 66 and the inner periphery of the nebulizer gas tube 67 is a nebulizer gas channel through which the nebulizer gas flows. A conductive member (not illustrated) is disposed on the upstream side of the capillary 66 illustrated in FIG. 2, and a charge is applied to the liquid sample by applying an ESI voltage to the conductive member.

Outside the nebulizer gas tube 67, there is disposed an assist gas nozzle 63 coaxially with the capillary 66 and the nebulizer gas tube 67. The tip portion of the assist gas nozzle 63 is formed in a tapered shape. The assist gas is supplied from an assist gas discharge hole 631 opened in an annular shape such that the assist gas surrounds the outer side of a jet flow of the charged droplets of the liquid sample ejected from the nozzle 65.

A housing 68 having an annular shape is provided around the assist gas nozzle 63. Inside the housing 68, there is formed the assist gas passage 61. In one place of the assist gas passage 61, there is formed a gas inlet 611, and on the opposite side of the housing 68 with respect to the gas inlet 611 across the center O of the housing 68, there is formed a gas outlet 612 communicating with the assist gas nozzle 63.

Figure 4:
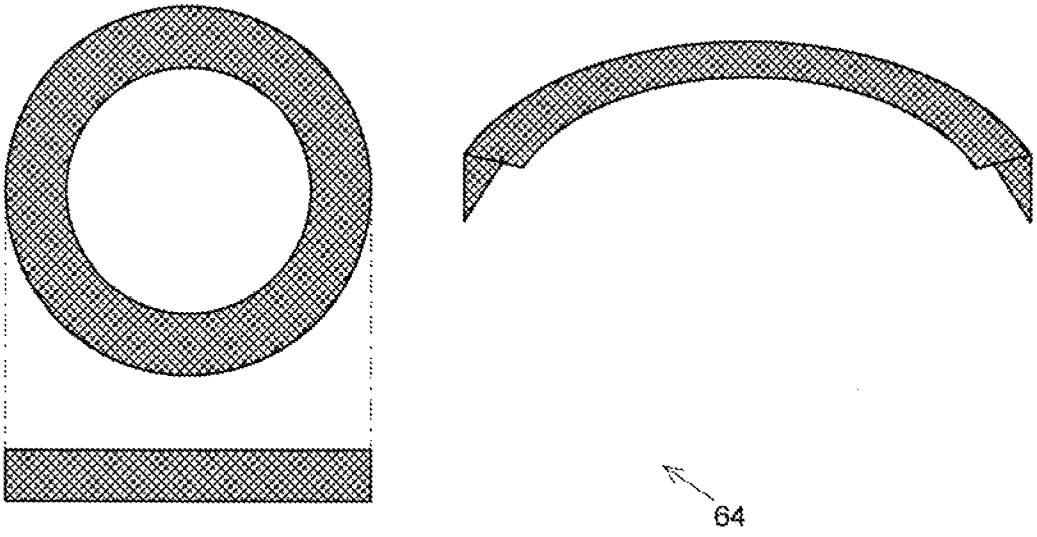
FIG. 4 illustrates a stainless steel (SUS) mesh that is a heat transfer member in the present embodiment.

In the assist gas passage 61, there are dispose: a substantially annular heater 62 covering substantially the entire circumference of the assist gas passage 61; and heat transfer members 64. In the present embodiment, as illustrated in FIG. 4, as the heat transfer members 64, there are used members each formed by molding a mesh made of stainless steel (SUS) into a shape corresponding to a space between the assist gas passage 61 and the heater 62 or corresponding to a space inside the heater 62. The upper left of FIG. 4 is a plan view of the heat transfer members 64 disposed inside the heater 62, and the lower left is a side view of the heat transfer members 64. The heat transfer member 64 illustrated on the right side of FIG. 4 is a perspective view of one of the heat transfer members 64 disposed between an inner wall surface of the assist gas passage 61 and the heater 62.

Figure 5:
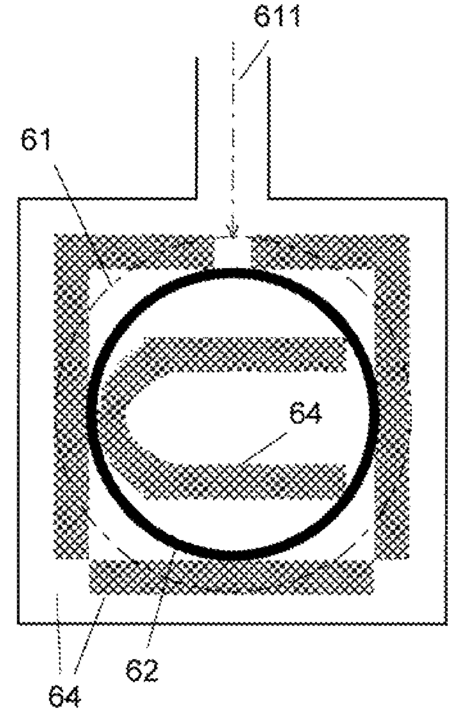
FIG. 5 is a diagram illustrating disposition of the heat transfer members in the present embodiment.
Figure 6:
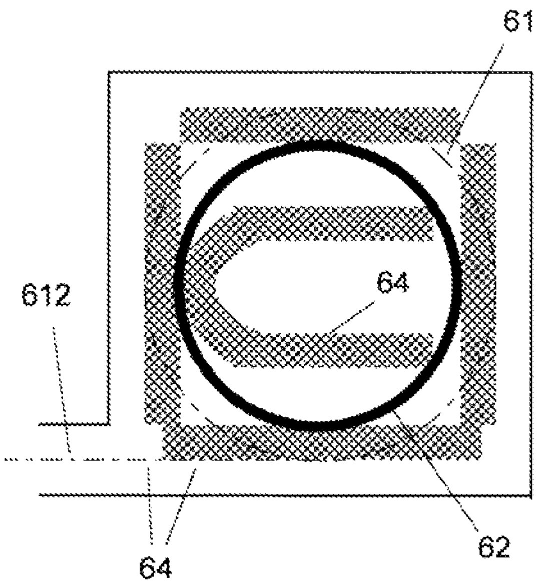
FIG. 6 is another diagram illustrating disposition of the heat transfer members in the present embodiment.

FIG. 5 illustrates how the heat transfer members 64 are disposed inside the assist gas passage 61 on the left side in FIG. 2, and FIG. 6 illustrate how the heat transfer members 64 are disposed inside the assist gas passage 61 on the right side in FIG. 2. The heat transfer members 64 are disposed such that the heat transfer members 64 are in contact with the heater 62 and fill space between the inner wall surface of the assist gas passage 61 and the heater 62. The heat transfer member 64 is also disposed inside the annular heater 62. Inside the heater 62, there is disposed a heat transfer member in which the heat transfer member 64 on the left side of FIG. 4 is folded and formed in a U shape. The inside of the assist gas passage 61 is heated by the heater 62 and the heat transfer members 64 to which heat from the heater 62 is transferred. FIGS. 5 and 6 illustrate that the heat transfer members 64 disposed in the space between the inner wall of the assist gas passage 61 and the heater 62 have an L-shaped cross-section or a linear cross-section. However, the configuration can be appropriately changed, for example, the heat transfer members 64 may have a circular cross-section. In FIGS. 5 and 6, the heat transfer member 64 disposed inside the heater 62 has a U-shaped cross-section, but may be appropriately changed by using a heat transfer member having a circular cross-section. The heat transfer members 64 only have to be in contact with the heater 62, and the arrangements of the heat transfer members 64 are not limited to those illustrated in FIGS. 5 and 6.

In the present embodiment, since a SUS mesh, which is easily deformed, is used as the heat transfer members 64, it is possible to tightly dispose the heat transfer members 64 to correspond to the shapes of the assist gas passage 61 and the heater 62. Because the mesh-shaped heat transfer members 64 have a large number of holes, the heat transfer members 64 do not disturb the flow of the assist gas.

Figure 7:
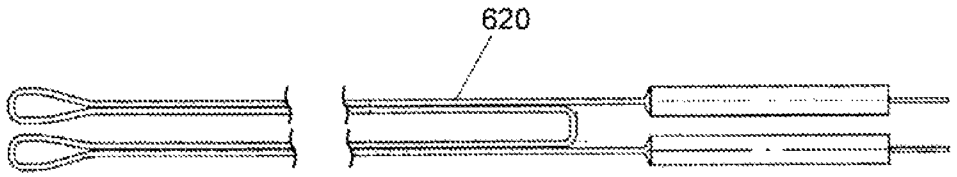
FIG. 7 is a diagram illustrating a configuration of a heater used in the present embodiment.
Figure 8:
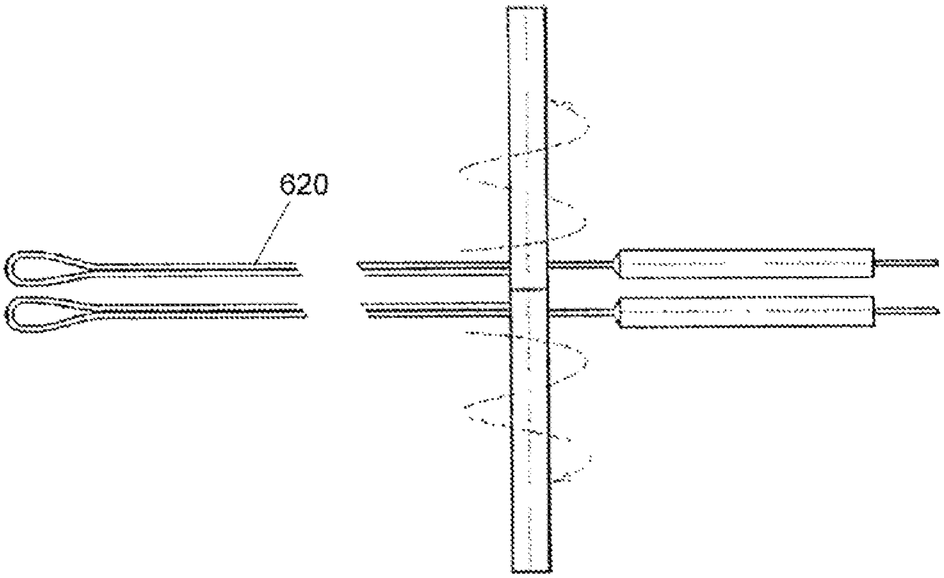
FIG. 8 is another diagram illustrating the configuration of the heater used in the present embodiment.
Figure 9:
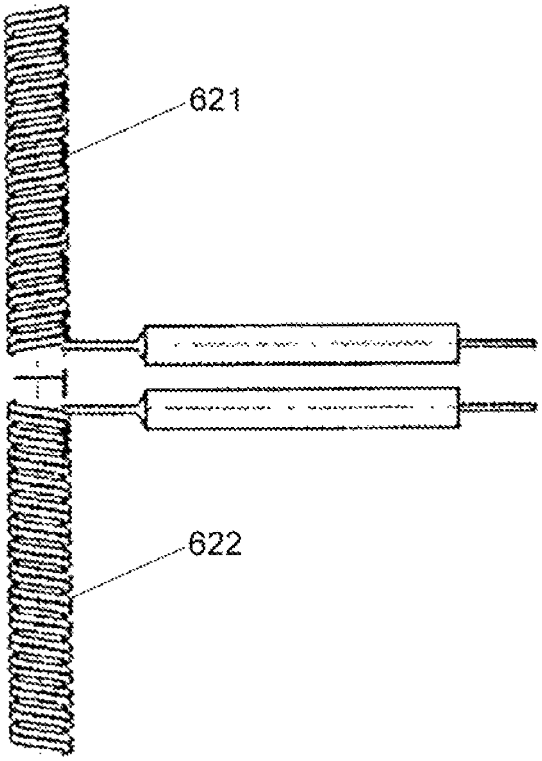
FIG. 9 is still another diagram illustrating the configuration of the heater used in the present embodiment.
Figure 10:
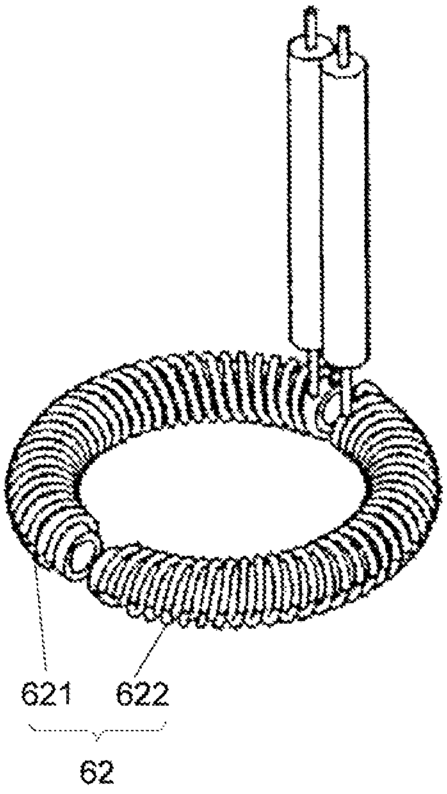
FIG. 10 is still another diagram illustrating the configuration of the heater used in the present embodiment.

The configuration of the heater 62 will be described with reference to FIGS. 7 to 10. The heater 62 of the present embodiment is a micro-sheath heater and is formed in such a manner that both wing portions of one heater wire 620 formed in a substantially Y shape as illustrated in FIG. 7 are each wound as illustrated in FIG. 8 so as to form two heating portions 621 and 622 as illustrated in FIG. 9. As illustrated in FIG. 10, the heating portions 621 and 622 are curved in a substantially semicircular shape, and the ends of the heating portions 621 and 622 are butted against each other, thereby completing the heater 62 including the two heating portions 621 and 622 having a substantially semicircular shape.

Each of the two heating portions 621 and 622 is configured in such a manner that two heater wires 620 in which electric current flows in opposite directions to each other are wound in a spiral manner and the outside of the heating portion is coated with an insulating material. Therefore, the directions of the magnetic fluxes induced by the electric currents flowing through the two heater wires 620 that are in close contact with each other are exactly opposite to each other, and cancel each other. Therefore, even when a heating current flows through the heating portions 621 and 622, an influence of the magnetic field induced by the heating current does not occur. In addition, since the heating portions 621 and 622 are coated with an insulating material, there is no concern of electric leakage, and the heater 62 can be safely used.

The assist gas is introduced into the assist gas passage 61 from the gas inlet 611. The direction in which the assist gas flows from the gas inlet 611 toward the assist gas passage 61 is substantially orthogonal to the assist gas passage 61. The gas passage from the gas inlet 611 to the gas outlet 612 includes two paths of the upper semicircular channel and the lower semicircular channel in FIG. 3, and the passage resistances of the both paths are substantially equal; therefore, the assist gas flows being equally divided for the upper channel and the lower channel.

The assist gases separately flowing in the two paths are each heated by the heater 62 and the heat transfer members 64, join before the gas outlet 612, and flow into the assist gas nozzle 63. The heating portions 621 and 622 have substantially the same shape, and the heat transfer members 64 are disposed to the same extent in the two paths. The amount of the assist gas flowing through each of the two paths is approximately the same, and the gas passing through either path is heated to approximately the same temperature. Therefore, unevenness is less likely to occur in the temperature of the assist gas, and a high-temperature assist gas is stably supplied.

The assist gas flowing into the assist gas passage 61 from the gas inlet 611 as described above is further heated as it moves toward the gas outlet 612; therefore, the temperature of the assist gas near the gas inlet 611 is low, and the temperature of the assist gas near the gas outlet 612 is high. The assist gas nozzle 63 is provided at a position far from the gas inlet 611 and, to the contrary, close to the gas outlet 612; therefore, the assist gas heated to a high temperature by the heater 62 flows into the assist gas nozzle 63 and is discharged from the assist gas discharge hole 631 almost without being cooled. Further, the assist gas nozzle 63 is positioned away from the assist gas passage 61 in the vicinity of the gas inlet 611 where the assist gas having a relatively low temperature exists; therefore, the assist gas nozzle 63 itself is hardly cooled. Therefore, the heat from the heater 62 and the heat transfer members 64 can be used without waste, and the assist gas having a stable high temperature can be discharged from the assist gas discharge hole 631.

In the conventional ionizer, only the heater 62 is disposed in the assist gas passage 61, and most of the assist gas flowing in the assist gas passage 61 is released without contacting the heater 62. Therefore, even when a micro-sheath heater capable of heating up to about 600° C. is used, the actually supplied assist gas is heated only up to 400° C. to 500° C.

On the other hand, in the present embodiment, the heat transfer members 64 in addition to the heater 62 are disposed in the assist gas passage 61, and the contact area between the assist gas flowing through the assist gas passage 61 and the heat source (the heater 62 and the heat transfer members 64) is made larger than before. As a result, the assist gas is heated with higher efficiency, and the assist gas having a higher temperature than before can be supplied. In addition, as the heater 62 itself, a heater similar to a conventional heater may be used, and the ionizer can be configured at low cost.

Next, an experiment will be described that was conducted to confirm that the ionizer of the above embodiment improves the heating efficiency of the assist gas. In this experiment, an assist gas (air) was introduced at a flow rate of 30 mL/min, electric power of 99 V was supplied to the heater 62, and a temperature change of the assist gas being discharged from the assist gas discharge hole 631 was measured. As a comparative example, the temperature change of the assist gas was measured under the same conditions as described above but with no heat transfer member 64 disposed.

Figure 11:
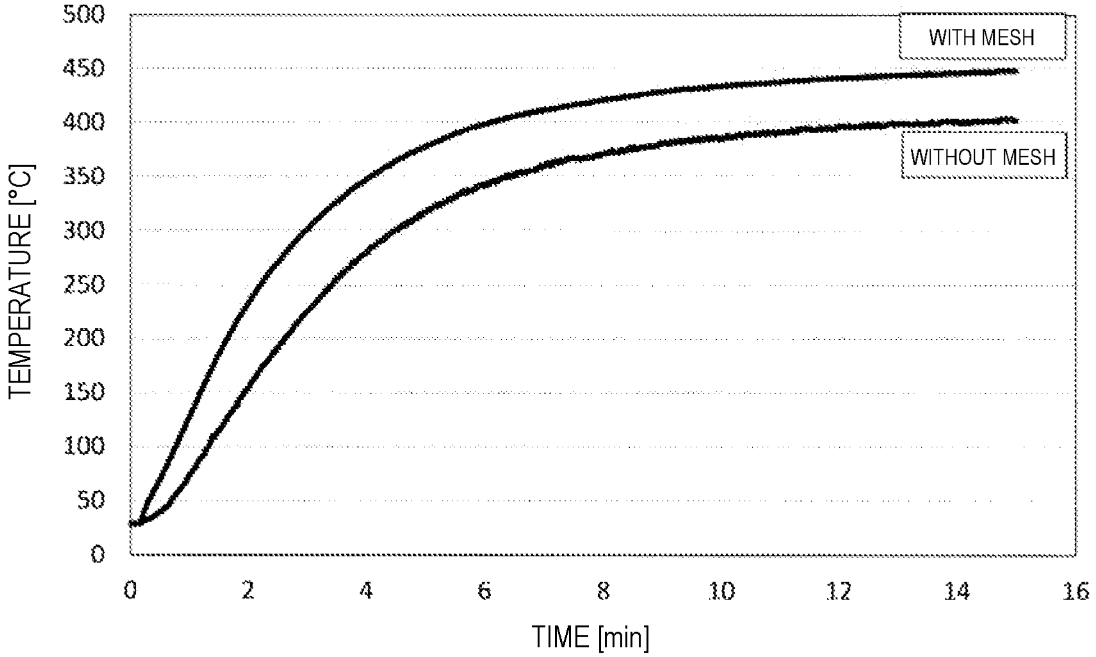
FIG. 11 illustrates an experimental result confirming an effect of heating the assist gas by the ionizer of the present embodiment.

FIG. 11 shows experimental results. As can be seen from the graph of FIG. 11, in the ionizer of the above embodiment, by disposing the heat transfer members 64, the assist gas was heated to a higher temperature more quickly (about 50° C. higher when 15 minutes had elapsed after the start of heating). In this experiment, the heating temperature of the assist gas was kept at 450° C., but it is considered that, if electric power of the same magnitude as in the conventional art were supplied, the assist gas could be heated to a temperature higher than 500° C.

The above-described embodiment is merely an example, and can be appropriately modified in line with the spirit of the present invention. The above embodiment has described a case where the ionizer is used in combination with the ESI ionization probe 60, but the ionizer can be used in combination with another ionization probe such as an ionization probe for atmospheric pressure chemical ionization (APCI), an ionization probe for atmospheric pressure photo ionization (APPI), or the like. In addition, in an ion analyzer such as a mass spectrometer or the like, when supplying a gas for heating a desolvation tube (the heated capillary 10 in the above embodiment) that takes ions generated in an ionization chamber into an analysis section in a subsequent stage, it is possible to use a configuration in which a heat transfer member is disposed in the same manner as described above.

In the above embodiment, the heat transfer members 64 are disposed between the assist gas passage 61 and the heater 62 and inside the heater 62; however, the heat transfer member 64 may be disposed only in one of them. For example, when the outer diameter of the heater 62 is near the diameter of the assist gas passage 61, even a configuration in which the heat transfer member 64 is disposed only inside the heater 62 can sufficiently improve the heating efficiency.

[Modes]

It will be understood by those skilled in the art that the exemplary embodiment described above is a specific example of the following modes.

(Clause 1)

An ionizer according to one mode includes:

an ionization chamber;

a sample nozzle configured to cause a liquid sample to flow out into the ionization chamber;

an assist gas passage configured to supply, to the ionization chamber, an assist gas that promotes desolvation of the liquid sample;

a heater disposed inside the assist gas passage; and a heat transfer member disposed in the assist gas passage in contact with the heater.

In the ionizer according to Clause 1, the assist gas for promoting desolvation of the liquid sample is supplied to the liquid sample flowing out from the sample nozzle. In the assist gas passage through which the assist gas flows, the heat transfer member in addition to the heater is disposed in contact with the heater. In the conventional ionizer, only the heater is disposed in the assist gas passage, and most of the assist gas flowing in the assist gas passage is released without contacting the heater. On the other hand, in the ionizer according to Clause 1, since the heat transfer member is disposed in addition to the heater, the contact area between the assist gas flowing through the assist gas passage and a heat source (the heater and the heat transfer member) is larger than before. Therefore, the assist gas is heated with higher efficiency, and it is possible to supply the assist gas having a higher temperature than before. In addition, a heater similar to the conventional heater can be used, and the ionizer can be configured at low cost.

(Clause 2)

In the ionizer according to Clause 1, the sample nozzle is configured to cause an atomization-promoting gas to spray the liquid sample into the ionization chamber, and the assist gas is supplied in such a direction as to push out a jet flow of the liquid sample ejected from the sample nozzle.

In the ionizer described in Clause 2, it is possible to cause the atomization-promoting gas to promote the desolvation of the jet flow of the liquid sample sprayed into the ionization chamber.

(Clause 3)

In the ionizer according to Clause 1 or 2, the heat transfer member has a mesh shape.

In the ionizer according to Clause 3, since the mesh-shaped heat transfer is easily deformed is used, the heat transfer member can be disposed to correspond to the shape of the assist gas passage. Because the mesh-shaped heat transfer member has a large number of holes, the heat transfer members 64 do not disturb the flow of the assist gas.

(Clause 4)

An ionizer according to Clause 4 is the ionizer according to any one of Clauses 1 to 3, wherein the heat transfer member is disposed between an inner wall of the assist gas passage and the heater.

In the ionizer according to Clause 4, it is possible to efficiently heat the assist gas flowing between the inner wall of the assist gas passage and the heater.

(Clause 5)

An ionizer according to Clause 5 is the ionizer according to any one of Clauses 1 to 4, wherein the heater includes a spirally wound heater wire.

In the ionizer according to Clause 5, the heater can uniformly heat the inside of the assist gas passage.

(Clause 6)

An ionizer according to Clause 6 is the ionizer according to Clause 5, wherein the heat transfer member is disposed inside the heater including the spirally wound heater wire.

In the ionizer of Clause 6, it is possible to efficiently heat the assist gas flowing inside the spirally wound heater.

(Clause 7)

An ionizer according to Clause 7 is the ionizer according to Clause 5 or 6, wherein the heater wire is coated with an insulating material.

In the ionizer according to Clause 7, the heater wire is insulated, so that the ionizer can be safely used. In addition, durability of the heater wire is improved.

(Clause 8)

A mass spectrometer according to Clause 8 includes:

the ionizer according to any one of Clauses 1 to 7; and a mass spectrometry section configured to perform mass spectrometry of ions generated by the ionizer.

The ionizer described in any one of Clauses 1 to 7 can be suitably used as an ionization part of a mass spectrometer.

REFERENCE SIGNS LIST

1 . . . Chamber
2 . . . Ionization Chamber
3 . . . First Intermediate Vacuum Chamber
4 . . . Second Intermediate Vacuum Chamber
5 . . . Analysis Chamber
60 . . . ESI Ionization Probe
61 . . . Assist Gas Passage
611 . . . Gas Inlet
612 . . . Gas Outlet
62 . . . Heater
620 . . . Heater Wire
621, 622 . . . Heating Portion
63 . . . Assist Gas Nozzle
631 . . . Assist Gas Discharge Hole
64 . . . Heat Transfer Member
65 . . . Nozzle
66 . . . Capillary
67 . . . Nebulizer Gas Tube
68 . . . Housing
7 . . . Liquid Sample Supply Tube

The invention claimed is:

1. An ionizer comprising:

an ionization chamber;

a sample nozzle configured to cause a liquid sample to flow out into the ionization chamber;

an assist gas passage configured to supply, to the ionization chamber, an assist gas that promotes desolvation of the liquid sample;

a heater disposed inside the assist gas passage; and a heat transfer member disposed in the assist gas passage in physical contact with the heater.

2. In the ionizer according to claim 1, wherein the sample nozzle is configured to cause an atomization-promoting gas to spray the liquid sample into the ionization chamber, and the assist gas is supplied in such a direction as to push out a jet flow of the liquid sample ejected from the sample nozzle.

3. The ionizer according to claim 1, wherein the heat transfer member has a mesh shape.

4. The ionizer according to claim 1, wherein the heat transfer member is disposed between an inner wall of the assist gas passage and the heater.

5. The ionizer according to claim 1, wherein the heater includes a spirally wound heater wire.

6. The ionizer according to claim 5, wherein the heat transfer member is disposed inside the heater including the spirally wound heater wire.

7. A mass spectrometer comprising:

the ionizer according to claim 1; and a mass spectrometry section configured to perform mass spectrometry of ions generated by the ionizer.

8. The ionizer according to claim 1, wherein the assist gas passage has an annular shape that surrounds the sample nozzle, and the heat transfer member is in contact with the heater at at least two opposing sides of the assist gas passage.

9. The ionizer according to claim 8, wherein the heat transfer member is formed in a U-shape or a circular shape.

10. The ionizer according to claim 8, wherein the heat transfer member is formed in a U-shape.

* * * * *